United States Patent
Meiri et al.

(10) Patent No.: US 6,883,018 B1
(45) Date of Patent: Apr. 19, 2005

(54) SCANNING A MESSAGE-LIST

(75) Inventors: David Meiri, Boston, MA (US); Dan Arnon, Boston, MA (US); Mark J. Halstead, Waltham, MA (US); Peter Kamvysselis, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 819 days.

(21) Appl. No.: 09/768,994

(22) Filed: Jan. 24, 2001

(51) Int. Cl.[7] .............................................. G06F 15/16
(52) U.S. Cl. ...................... 709/205; 709/201; 709/206; 709/207; 718/106
(58) Field of Search ............................... 709/201, 205, 709/206, 207; 718/106

(56) References Cited

U.S. PATENT DOCUMENTS

| | | | | |
|---|---|---|---|---|
| 5,195,181 A | * | 3/1993 | Bryant et al. ............... | 709/215 |
| 5,261,096 A | * | 11/1993 | Howarth ...................... | 709/242 |
| 5,335,281 A | * | 8/1994 | Tugenberg et al. .......... | 709/209 |
| 5,335,324 A | * | 8/1994 | Orimo et al. ................ | 709/236 |
| 5,544,347 A | | 8/1996 | Yanai et al. | |
| 5,742,792 A | | 4/1998 | Yanai et al. | |
| 5,854,895 A | * | 12/1998 | Nishina et al. .............. | 709/221 |
| 5,889,935 A | | 3/1999 | Ofek et al. | |
| 5,933,653 A | | 8/1999 | Ofek | |
| 5,999,964 A | * | 12/1999 | Murakata et al. ........... | 709/201 |
| 6,044,444 A | | 3/2000 | Ofek | |
| 6,052,797 A | | 4/2000 | Ofek et al. | |
| 6,092,066 A | | 7/2000 | Ofek | |
| 6,104,869 A | * | 8/2000 | Minoya et al. .............. | 709/204 |
| 6,157,991 A | | 12/2000 | Arnon | |
| 6,173,377 B1 | | 1/2001 | Yanai et al. | |
| 6,275,897 B1 | | 8/2001 | Bachmat | |
| 6,477,627 B1 | | 11/2002 | Ofek | |
| 6,493,796 B1 | | 12/2002 | Arnon et al. | |
| 6,502,205 B1 | | 12/2002 | Yanai et al. | |
| 6,519,234 B1 | * | 2/2003 | Werkander ................... | 370/328 |
| 6,570,885 B1 | * | 5/2003 | Gregg .......................... | 370/428 |
| 6,728,758 B1 | * | 4/2004 | Sato ............................. | 709/206 |

* cited by examiner

Primary Examiner—Saleh Najjar
(74) Attorney, Agent, or Firm—Choate, Hall & Stewart LLP

(57) ABSTRACT

A method for scanning a message-list accessible to a plurality of processors includes retrieving, from a cache associated with a scanning processor from the plurality of processors, information identifying a starting message-slot. This information is then used to begin a scan of the message-list at that starting message-slot. The information indicating the starting message-slot is obtained by identifying, in the message-list, a message-slot containing a message intended for a recipient processor from the plurality of processors and obtaining, from the identified message-slot, information indicative of a location of a succeeding message-slot in the message-list. This information is then cached, for retrieval during a subsequent scan of the message-list.

18 Claims, 16 Drawing Sheets

SCANNING A MESSAGE-LIST

This invention relates to distributed computer systems, and in particular, to communication between processors in a distributed computer system.

BACKGROUND

A distributed computer system includes several processors that cooperate to perform a task. To cooperate more effectively, the processors often send messages to each other. One method of sending a message from one processor to another is to maintain a message-list in a memory that is accessible to all the processors. Each processor can periodically scan this message-list for messages. A processor can thus post a message in that message-list. Eventually, the processor for which that message is intended will scan the message-list and encounter that message.

The message-list is typically an ordered sequence of messages having a first message and a last message. These messages are arranged in the order in which a scanning processor will encounter them. In most cases, the messages are arranged in chronological order, with the oldest message being at the beginning of the message-list and the most recently posted messages near the end of the message-list.

A scanning processor typically scans a message-list by beginning at the first message and proceeding sequentially through the message-list until it either reaches the last message or until it encounters a message for which it is an intended recipient. This ensures that the scanning processor will encounter older messages before it encounters newer messages. If the scanning processor encounters a message for which it is an intended recipient, it interrupts its scan to retrieve and process that message. The next time the scanning processor scans the message-list, it begins again at the first message of the message-list. This simple scanning method guarantees that the scanning processor will always encounter older messages before it encounters newer messages.

One property of this scanning method is that a scanning processor may inspect messages far more often than necessary. In particular, messages near the beginning of the message-list are likely to be repeatedly inspected. Where the distributed computing system has only a small number of processors, the message-list is not very long. Hence, the repeated inspection of messages near the beginning of the message list does not consume appreciable amounts of time.

As distributed computing systems have become more complex, the number of processors within such systems has grown. As a result, the message-lists in such systems have lengthened. Because of this, the time spent unnecessarily re-inspecting messages has become more significant.

SUMMARY

In a distributed computing system according to the invention, a scanning processor's next scan of the message-list begins where its previous scan left off. As a result, the scanning processor avoids unnecessarily inspecting messages that it may have already inspected during a previous scan. In one optional feature of the invention, the scanning processor periodically begins its next scan at the beginning of the message list instead of where its previous scan left off.

In a system incorporating the invention, a scanning processor selected from a plurality of processors having access to a message list identifies, in the message-list, a message-slot containing a message for which it is an intended recipient. The scanning processor then obtains, from the identified message-slot, information indicative of a location of a succeeding message-slot in the message-list. The scanning processor then caches this information for retrieval during a subsequent scan of the message-list.

In one aspect of the invention, a next-message pointer associated with the identified message slot embodies information indicative of the location of a succeeding message-slot in the message-list. This information provides the scanning processor with a starting location for beginning a subsequent scan of the message-list.

The information indicative of the succeeding message slot in the message-list is typically cached in a memory that is local to the scanning processor. However, this information can also be cached in any location accessible to the scanning processor when a subsequent scan of the message-list is to begin.

To avoid skipping over one or more message slots in the message-list, the scanning method can also include a test for the existence of a reset condition. If the scanning processor detects the occurrence of a reset condition, it begins its next scan of the message-list at the beginning of the message-list instead of where the previous scan left off. This can be implemented by storing information indicative of the location of the succeeding message slot only in the absence of a reset condition. Alternatively, this can be achieved by storing a pointer to the first message on the message-list whenever a reset condition occurs.

One possible reset condition arises when the information indicative of the location of the succeeding message slot identifies an invalid location. Another possible reset condition arises when a number of scans since a previous occurrence of a reset condition exceeds a reset threshold. This reset threshold can be a fixed, pre-selected reset threshold, or an adaptively selected reset threshold whose value depends upon the likelihood with which the scanning processor will skip over one or more slots in the message-list.

To scan a message-list accessible to a plurality of processors, a scanning processor retrieves, from its cache, information identifying a starting message-slot. This information can be a pointer to a message subsequent to a previous message intended for the scanning processor. The scanning processor then begins scanning the message-list at this starting message-slot.

In one practice of the invention, the scanning processor begins a scan of the message-list by determining whether a reset condition exists. The scanning processor then proceeds with scanning the message-list at the starting message-slot if no reset condition exists. A reset condition can be deemed to exist when the information indicative of the location of the starting message-slot identifies an invalid location. Alternatively, a reset condition can be deemed to exist when a number of scans since a previous occurrence of a reset condition exceeds a reset threshold.

A data-storage system according to the invention includes: a plurality of processors, each of which has a local memory; a shared memory accessible to each processor in the plurality of processors; and a message section maintained in the shared memory. The message section includes a message-list having an ordered sequence of message-slots, each of which includes information identifying a succeeding slot in the message-list.

The local memory associated with each processor can include a cache for storage of information identifying a succeeding slot. This cache can include a look-ahead pointer that identifies the succeeding message-slot.

In one embodiment of the data-storage system, the cache includes a counter indicating an interval since a scanning processor encountered a message-slot containing a message for which that scanning processor was an intended recipient. Such a counter can indicate a number of scans since a scanning processor encountered a message-slot containing a message for which that scanning processor was an intended recipient.

The local memory of a processor from the data-storage system according to the invention can also include a reset-detecting process configured to detect a reset condition. In one embodiment, the reset-detecting process is configured to compare a reset threshold with an interval since a scanning processor encountered a message-slot containing a message for which that scanning processor was an intended recipient. The reset threshold can be a pre-specified constant or an adaptively determined quantity whose value depends upon the operating characteristics of the data-storage system. In another embodiment, the reset-detecting process is configured to detect whether the information identifying a succeeding slot in the message-slot is invalid.

These and other features of the invention will be apparent from the following detailed description and the accompanying figures, in which:

DETAILED DESCRIPTION

Figure 1:
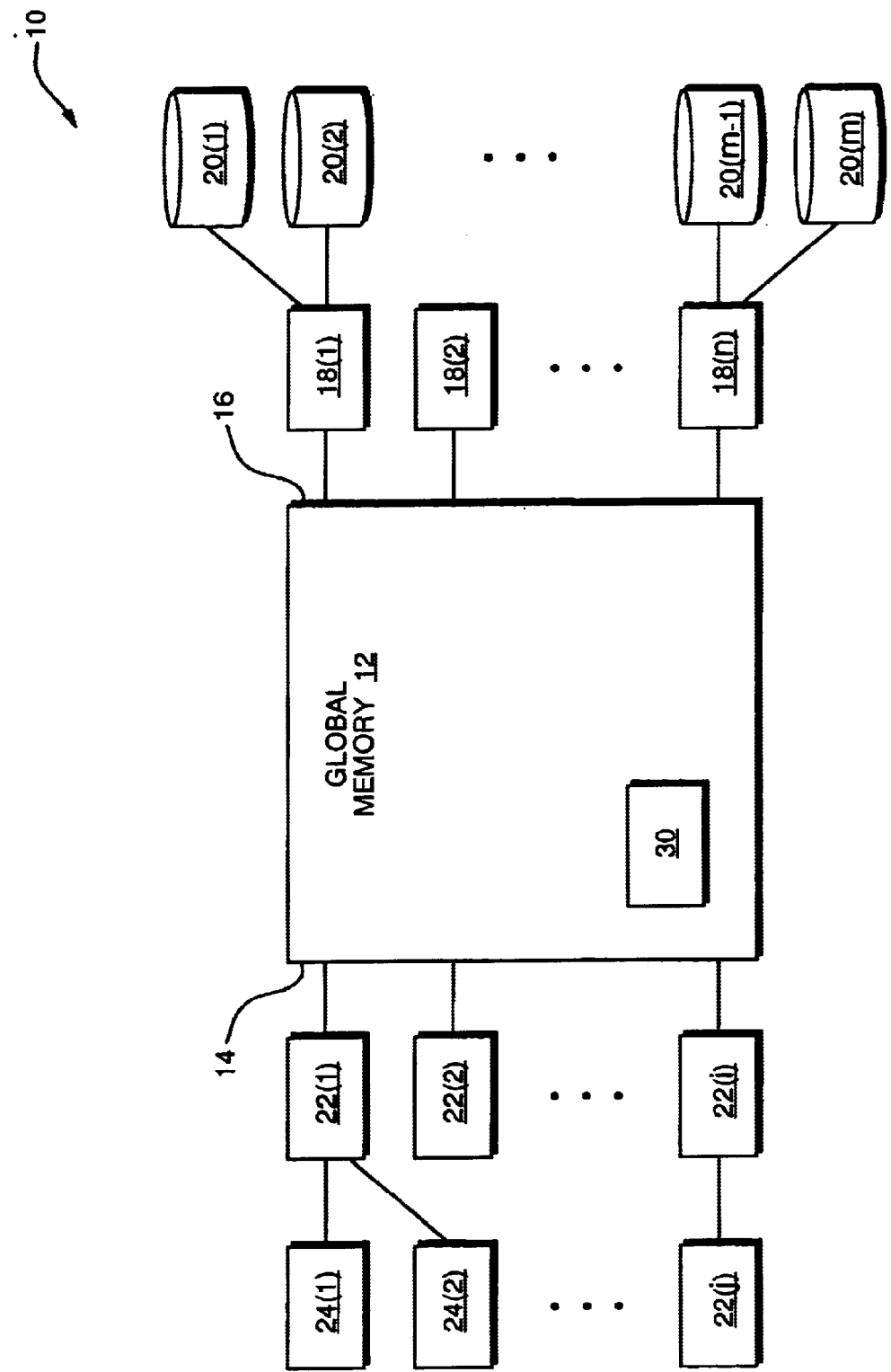
FIG. 1 shows a data-storage system for implementing the messaging system of the invention.

FIG. 1 shows a data-storage system 10 for practice of the message-scanning system according to the invention. The data-storage system 10 includes a global cache memory 12 (hereafter referred to as "shared memory") having a front-end 14 and a back-end 16. At its back-end 16, the shared memory 12 is in data communication with a plurality of device controllers 18(1)–18(n), each of which controls a plurality of mass-storage devices 20(1)–20(m). At its front-end 14, the shared memory 12 is in data communication with a plurality of host adaptors 22(1)–22(i), each of which is in communication with a plurality of hosts 24(1)–24(j). The disk storage system can also include network interfaces 26(1)–26(k) for managing such tasks as maintaining mirror data-storage systems across a network. Each host adaptor 22, device controller 24, and network interface 26 includes its own associated processor.

Figure 2:
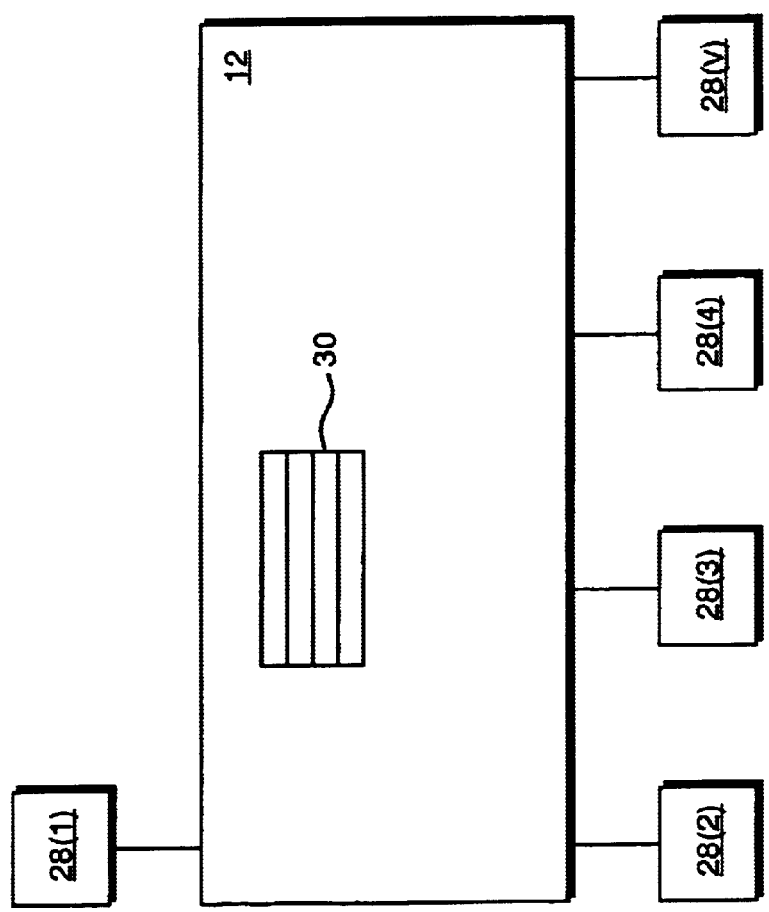
FIG. 2 shows the configuration of the shared memory in FIG. 1.

FIG. 2 shows the shared memory 12 in communication with the above-mentioned processors 28(1)–28(v) associated with the foregoing components. Each processor 28(1)–28(v) includes a local memory 29(1)–29(v) that is not accessible to other processors. To cooperate effectively, the processors 28 communicate with each other. Since the processors 28 are not in direct communication with each other, a sending processor 28(1) that wishes to send a message to one or more receiving processors 28(2)–28(3) writes that message in a message section 30 in the shared memory 12. Each processor 28 then periodically checks the message section 30 for new messages.

Figure 3:
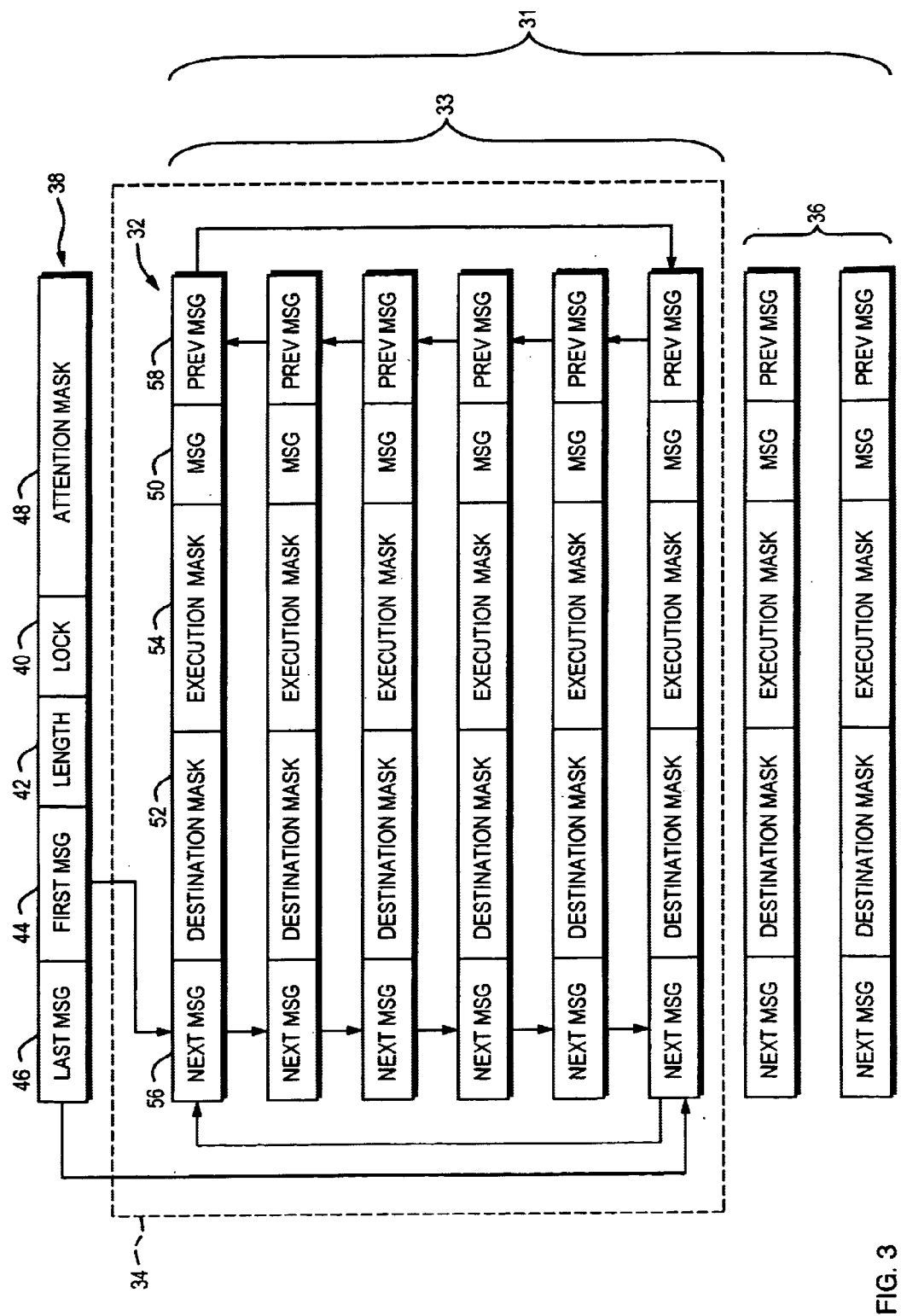
FIG. 3 shows the message section of FIG. 2.

The message section 30, shown in more detail in FIG. 3, includes a large number of message-slots 32. Each message-slot 32 (hereafter referred to as a "slot") can transition between a free state and an occupied state. An ordered sequence of occupied slots 33 linked to each other by pointers forms a message-list 34. Free slots 36 remain available for transformation into occupied slots should there be a need to do so. An occupied slot 33 whose message has been read by all its intended recipients becomes a free slot 36 and is detached from the message-list 34. The composition of the message-list 34 thus constantly changes, as slots 32 transition between being free slots 36 and occupied slots 33.

The circulation of slots 32 into and out of the message-list 34 is summarized by a message directory 38. The message directory 38 includes several fields, each of which can be changed or read by a processor. These fields include a lock field 40, a length field 42, a first-message pointer 44, a last-message pointer 46, and an attention mask 48.

The lock field 40 is set by a processor at specified times to avoid the occurrence of a race condition. When the lock field 40 is set, no other processor can modify the message section 30. It is therefore desirable that the interval during which the lock field 40 is set be as brief as possible.

The length field 42 contains the current number of slots in the message-list 34. A processor that adds a message to the message-list 34 increments the value of this length field 42. A processor that removes a message from the message-list 34 decrements the value of the length field 42.

The first-message pointer 44 contains the memory address of the first slot in the message-list 34. Similarly, the last-message pointer 46 contains the memory address of the last slot in the message-list 34. The first and last-message pointers 44, 46 are adjusted by a processor in the course of inserting and removing slots from the message-list 34. The last-message pointer 46 and the length field 42 enable a processor scanning the message-list 34 to determine when to stop scanning.

Each processor is assigned one bit in the attention mask 48. When a sending processor intends a message to be received by one or more receiving processors, it modifies the attention mask 48 by setting the bit assigned to each of the receiving processors. When a receiving processor finishes reading all messages intended for it in the message-list 34, it resets its assigned bit in the attention mask 48. The attention mask 48 thus functions as a dynamic listing of all processors that have at least one unread message in the message-list 34.

Each slot 32 includes a message field 50 for holding a message, a destination mask 52, an execution mask 54, a next-message pointer 56, and a previous-message pointer 58. A processor can read the contents of a slot 32 at any time. However, a processor can only make changes to a slot 32 when shared memory 12 is unlocked.

Each processor is assigned a bit in the destination mask 52. A sending processor addresses a message by setting the assigned destination-mask bits for all the intended recipients of the message. The destination mask 52 is thus a static list of all the intended recipients for the message contained in the slot's message field 50.

The execution mask 54 is initially a copy of the destination mask 52. When an intended recipient has read the message contained in the message field 50, it resets its assigned bit in the execution mask 54. Consequently, once all the intended recipients of a message have read that message, the execution mask 54 will have been completely reset. The execution mask 54 of a slot thus functions as a dynamically changing list of those intended recipients who have yet to read the message carried by that slot. As a corollary, the execution mask 54 indicates when all the intended recipients of a message have read that message, and therefore when the message can be safely removed from the message-list 34.

The next-message pointer 56 and the previous-message pointer 58 together indicate a slot's position in the ordered sequence of slots that make up the message-list 34. The next-message pointer 56 shows the memory address of the immediately succeeding slot in the message-list 34; the previous-message pointer 58 shows the memory address of the immediately preceding slot on the message-list 34.

Posting a Message on the Message-List

Figure 4:
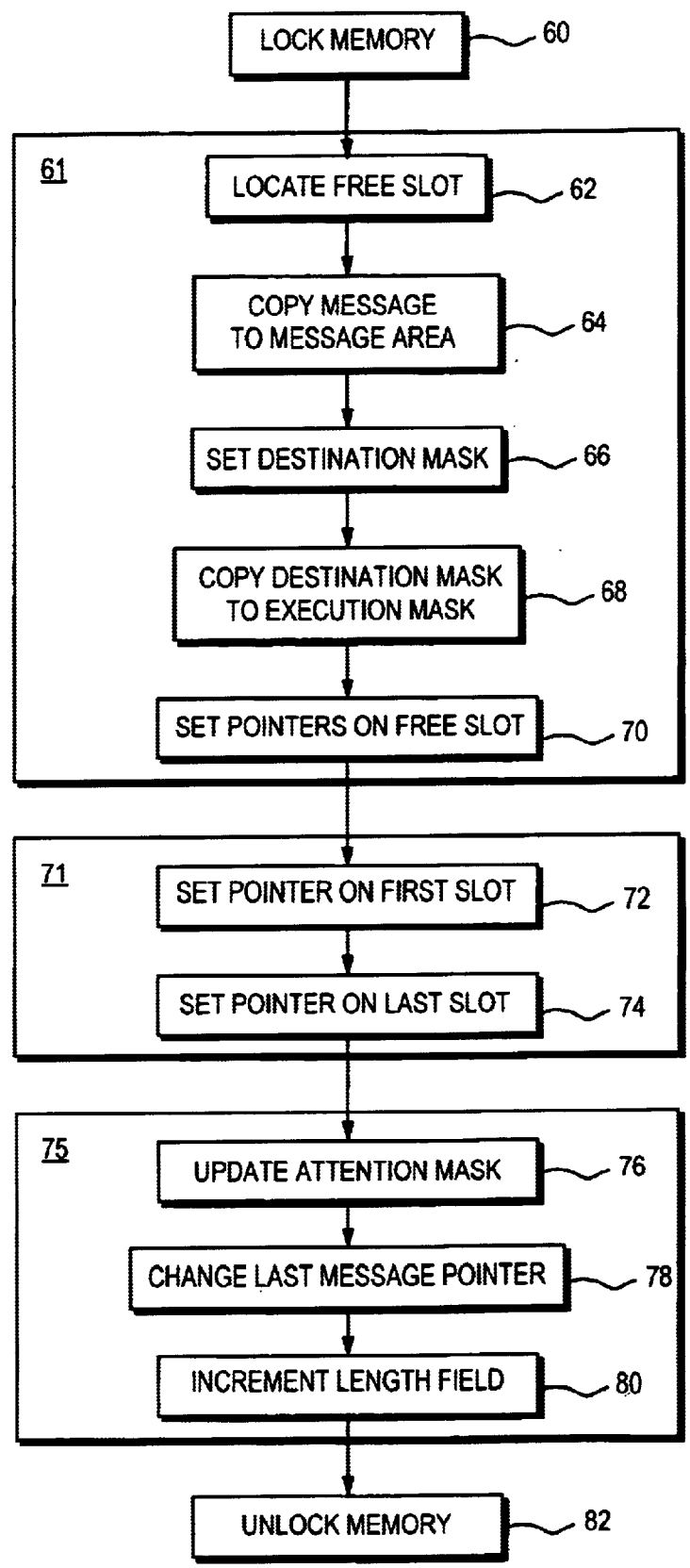
FIG. 4 is a flowchart of a process for adding a new message to the message-list in FIG. 3.

FIG. 4 shows the process by which a sending processor leaves a message for one or more receiving processors. The sending processor begins by setting 60 the lock field 40 in the message directory 38. This prevents any other processor from altering the message-list 34. It does not, however, prevent other processors from scanning the message-list 34 to determine if any messages are present. The method of the invention thus permits one sending processor to add a new message to the message-list 34 even while one or more scanning processors scan that message-list 34.

The sending processor then begins the process of creating 61 a valid message by first selecting 62 a new-message slot into which a message can be placed. It does so by reading the last-message pointer 46 in the message directory 38 to determine the memory address of the last slot in the message-list 34. The slot following the last slot on the message-list 34 is then designated as a candidate new-message slot, or "candidate slot". The sending processor then checks to see that the destination mask 52 of the candidate slot is completely reset. If it is, the sending processor designates the candidate slot to be the new-message slot. Otherwise, the sending processor locates another candidate slot and repeats the foregoing procedure. This process continues until the sending processor locates a slot that has a completely reset destination mask 54.

The sending processor needs not check the destination mask 52 of the candidate slot as described above. Instead, the sending processor can assume that the next slot following the last slot on the message-list 34 is the next-free-slot. Although this will be true in most cases, there are rare exceptions. By checking the destination mask 52, the sending processor confirms that the candidate slot is in fact a free slot. Since checking the destination mask 52 is not a significantly time-consuming operation, the process of identifying a new-message slot can be carried out rapidly.

Once the sending processor has designated the new-message slot, it writes 64 its message in the message field 50 of that slot. The sending processor then sets 66 the destination mask 52 of the new-message slot to correspond to the intended recipients of the message. It does so by ensuring that those bits in the destination mask 52 that correspond to intended recipients are set and that the remaining bits in the destination mask 52 are reset. After having set the destination mask 52, the sending processor copies 68 the destination mask 52 to the execution mask 54 of the new-message slot.

Although the new-message slot now holds a valid message, the message remains inaccessible to its intended recipients until the new-message slot is spliced into the message-list 34. In preparation for splicing the new-message slot into the message-list 34, the sending processor modifies 70 the next-message and previous-message pointers of the new-message slot so that they point to the first slot in the message-list 34 and to the last slot in the message-list 34 respectively.

With the new-message slot now ready for splicing, the sending processor splices 71 it into the message-list 34. To do so, the sending processor modifies 72, 74 the previous-message pointer 58 of the first slot on the message-list 34 and the next-message pointer 56 of the last slot on the message-list 34 so that they both point to the new-message slot. This splices the new-message slot into the message-list 34 between the first slot and what was formerly the last slot on the message-list 34. At the completion of this operation, the new-message slot becomes the last slot on the message-list 34.

Although the new message is now in the message-list 34, the intended recipients may not know of the message's existence. To announce 75 the existence of the new message to the intended recipients, the sending processor updates 76 the attention mask 48 of the message directory 38 by setting the attention mask bits assigned to the intended recipient of the new message.

In one practice of the invention, the sending processor updates the attention mask 48 by evaluating the OR of the new message's destination mask 52 and the attention mask 48 and then overwriting the attention mask 48 with the result of this operation. Then, the sending processor changes 78 the last-message pointer 46 in the message directory 38 to point to the new-message slot (which is now the last slot) in the message-list 34. The sending processor also increments 80 the length field 42 in the message directory 38. Finally, the sending processor unlocks 82 the shared memory 12.

Figure 5:
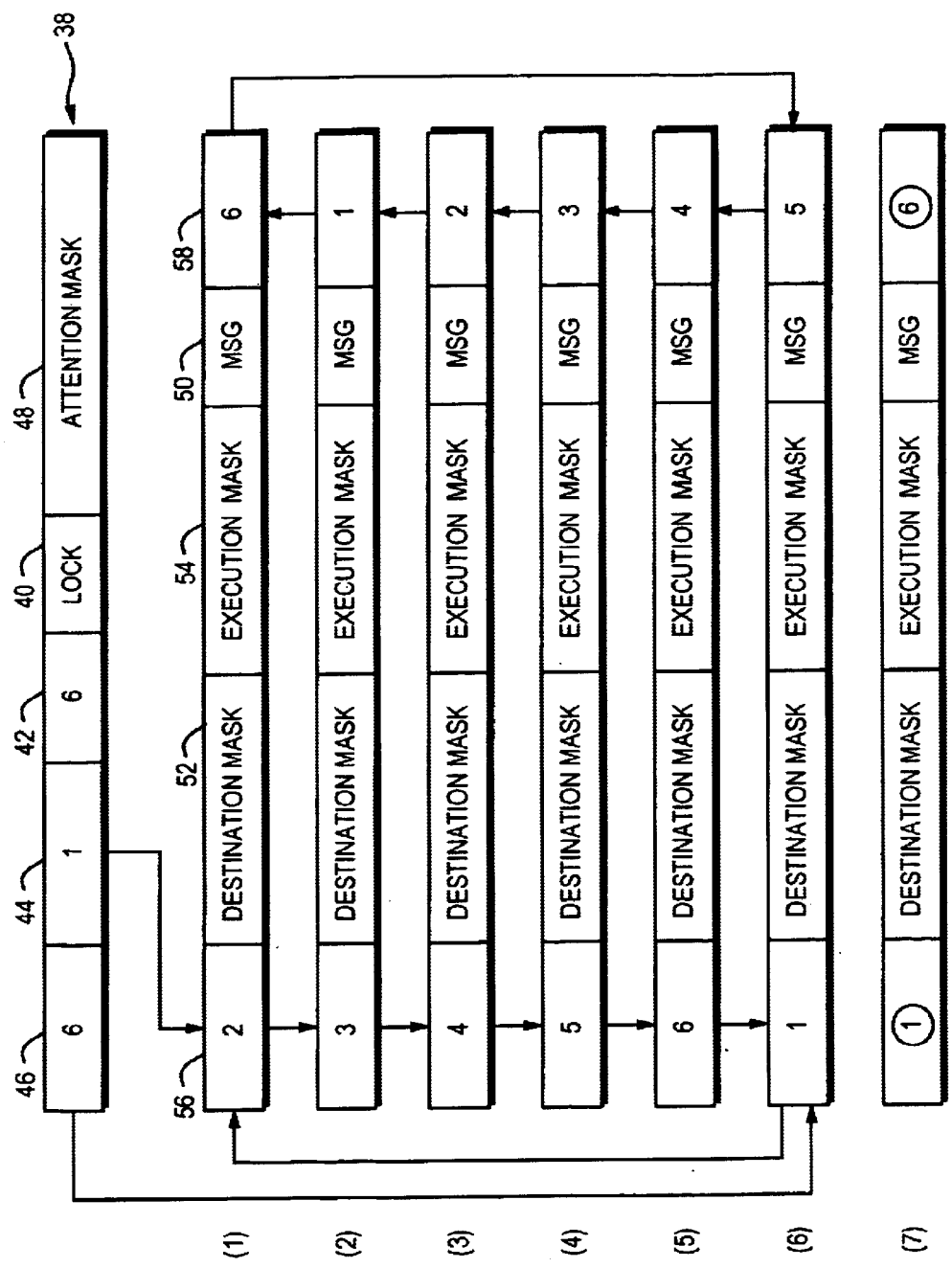
FIG. 5 shows the message-list of FIG. 3 before adding a new message.

FIG. 5 shows the state of the message section 30 just before the sending processor splices a new message into the message-list 34. As indicated by the message directory 38, the message-list 34 has six slots linked to each other by pairs of pointers. The slots are numbered from 1 to 7 with the understanding that these numbers are selected to facilitate an understanding of the process. In fact, a slot is identified by a memory address. Although the message-list 34 is an ordered sequence of slots, the slots themselves need not be sequentially numbered in memory space.

As indicated by the message directory 38, the first slot of the message-list 34 is slot 1 and the last slot is slot 6. The previous-message pointer 58 of slot 1 points to the last slot, namely slot 6. The next-message pointer 56 of the last slot points back to the first slot, namely slot 1. The message-list 34 is thus a cyclical list. Although the foregoing discussion refers to a first slot and a last slot on the message-list 34, the designation of which particular slot is the first slot is arbitrary because the message-list 34 is cyclical. Hence, just as a circle has no beginning or end, a cyclical message-list 34 of message slots has no natural first or last message slot.

The new-message slot, namely slot 7, is shown with its next-message pointer 56 already pointing to the first slot of the message-list 34 and its previous-message pointer 58 already pointing to what is currently the last slot in the message-list 34, namely slot 6. The new-message slot is thus primed for replacing slot 6 as the last slot on the message-list 34.

Figure 6:
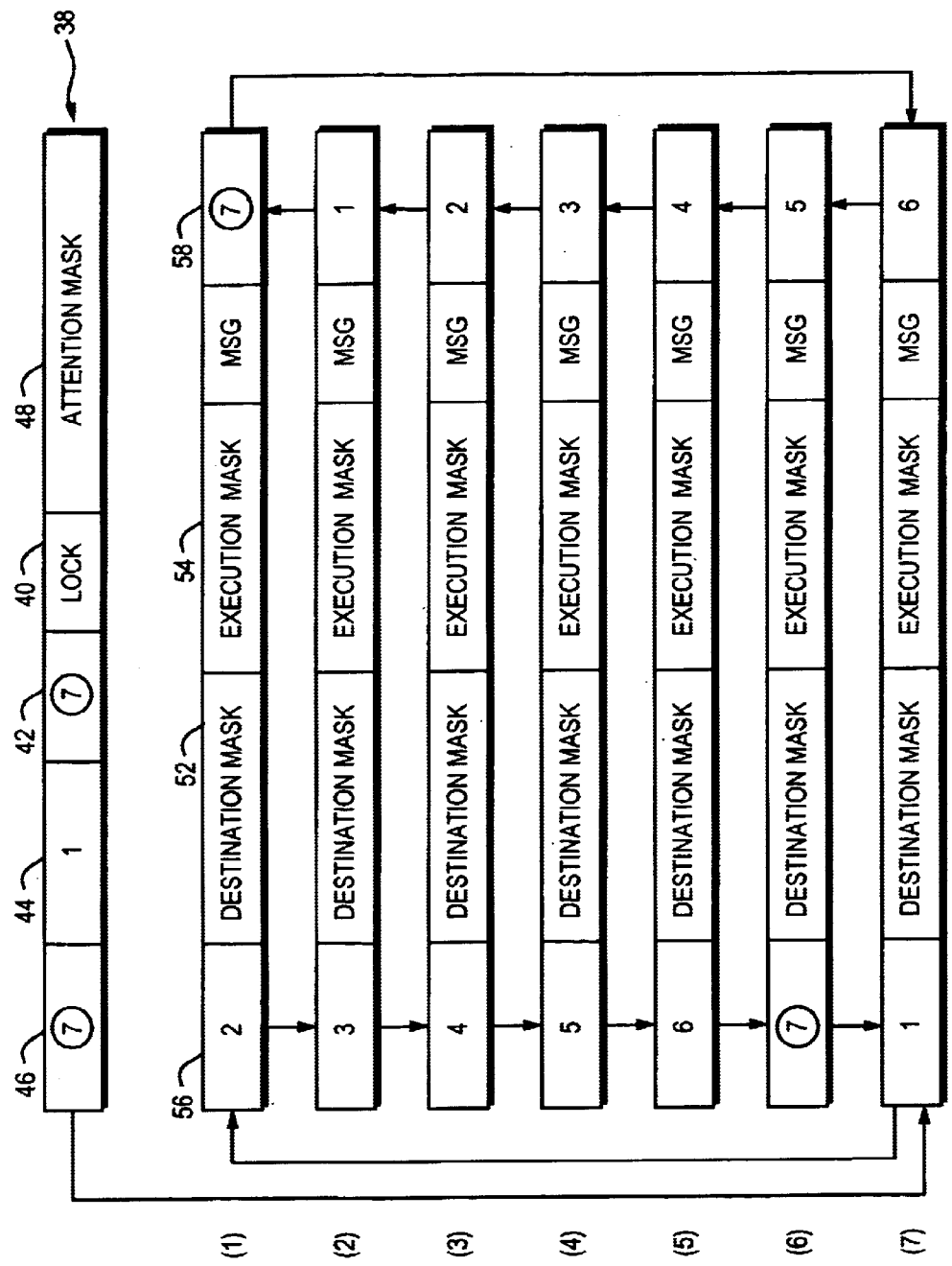
FIG. 6 shows the message-list of FIG. 5 after adding a new message.

FIG. 6 shows the result of splicing slot 7 into the message-list 34. A comparison of FIGS. 5 and 6 shows that only the previous-message pointer 58 of the first slot (which now points to slot 7 instead of to slot 6) and the next-message pointer 56 of slot 6 (which now points to slot 7 instead of back to slot 1) have changed. In addition, the message directory 38 has been updated to show that there are now seven slots in the message-list 34, with the last slot now being slot 7. The attention mask 48 in the message directory 38 may or may not have changed, depending on whether all the recipients of the message in slot 7 already have pending messages in the message-list 34.

Scanning the Message-List

Figure 7:
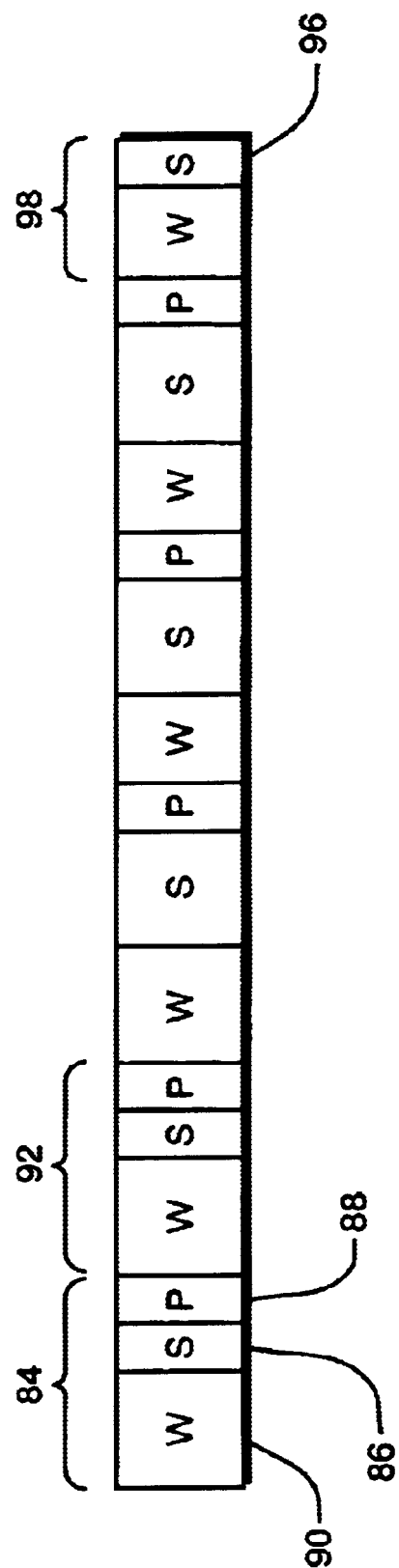
FIG. 7 shows the three states of each scan cycle.

As shown in FIG. 7, each processor 28 in the system shown in FIG. 2 spends its time in a scan-cycle 84 that consists of: a scan-state 86, during which it scans the message-list 34; an optional processing-state 88, during which it processes any messages found during its scan-state 86; and a wait-state 90, during which it attends to other tasks. As suggested by FIG. 7, the time spent in the scan-state 86 is not constant from one scan-cycle to the next. This is because a scanning processor scans the message-list 34 until it encounters a slot containing a message for which it is an intended recipient. The length of the scan-state 86 thus depends on the distribution of messages in the message-list 34.

Upon encountering a message for which it is an intended recipient, the scanning processor enters the processing-state 88 to process that message. During the processing state, the scanning processor executes any instructions contained in that message. After processing the message, the scanning processor enters its wait-state 90 until the beginning of a next scan-cycle 92.

Figure 8:
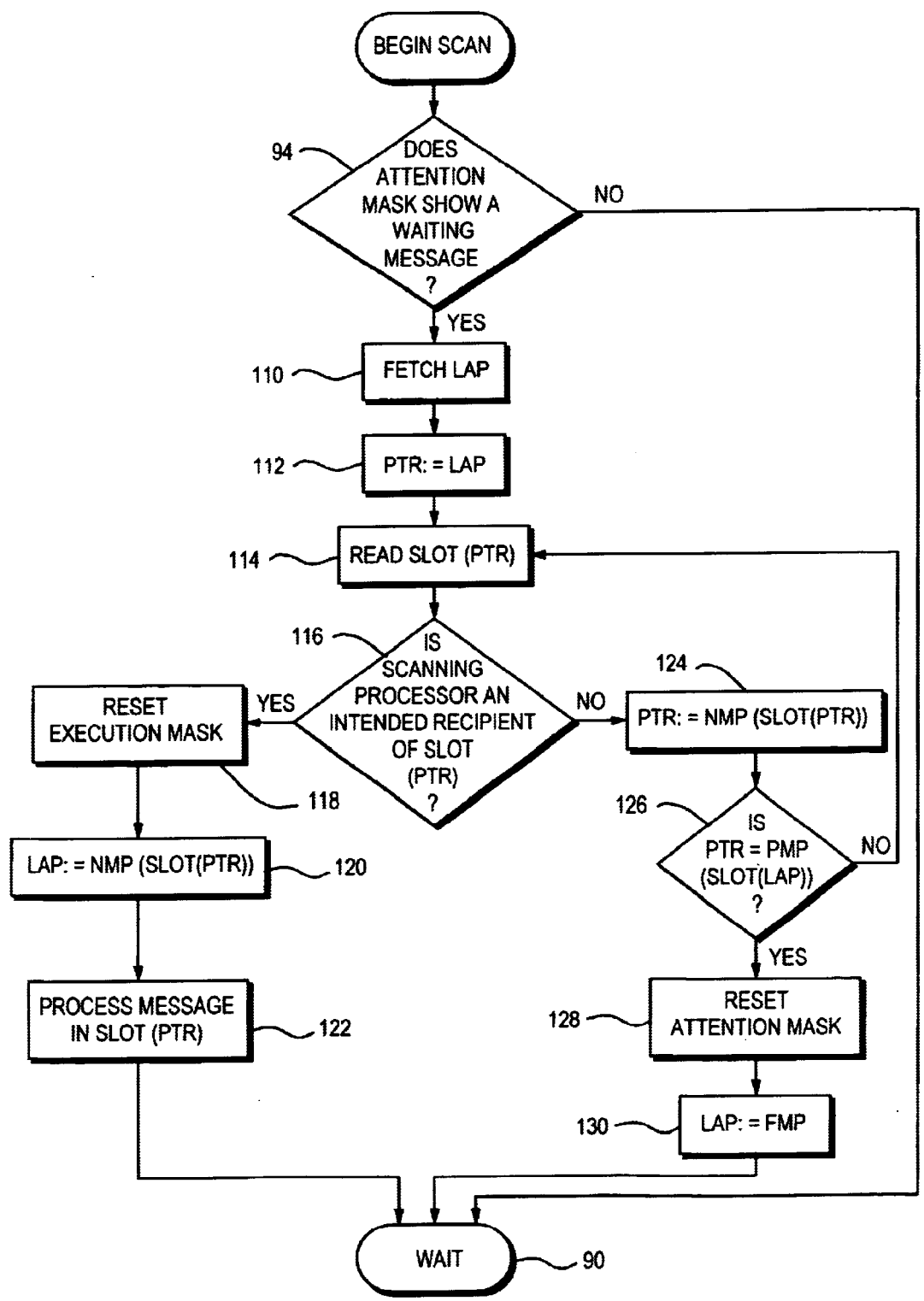
FIG. 8 is a flow-chart of a scanning method that does not include a test for a reset condition.

FIG. 8 shows the process by which a scanning processor scans the message-list 34 for messages during a typical scan-state 86 shown in FIG. 7. In an optional feature of the scanning method, the scanning processor begins the scan-state 86 by inspecting 94 its assigned bit in the attention mask 48 of the message directory 38. This prevents unnecessary scanning of the message-list 34 when there exist no waiting messages for the scanning processor.

If the assigned bit in the attention mask 48 is reset, the scanning processor recognizes that there are no messages intended for it in the message-list 34. When this is the case, the scanning processor does not scan the message-list 34. Instead, it immediately returns to the wait-state 90. The brief scan-state 96 and the absence of a processing state in the last scan-cycle 98 in FIG. 7 together suggest that during this last scan cycle 98, the scanning processor did not scan the message-list 34 at all.

If the scanning processor's assigned bit in the attention mask 48 is set, the scanning processor determines a starting slot on the message-list 34 and scans the message-list 34 beginning at that starting slot. As described more fully below, the selection of a starting slot has significant repercussions in the performance of the scanning method.

In a first scanning method, the starting slot is always the first slot in the message-list 34, as indicated by the first-message pointer 44 of the attention mask 48. When this first scanning method is used, scan-states in successive scan-cycles will tend to progressively lengthen, as shown in FIG. 7.

Figure 9:
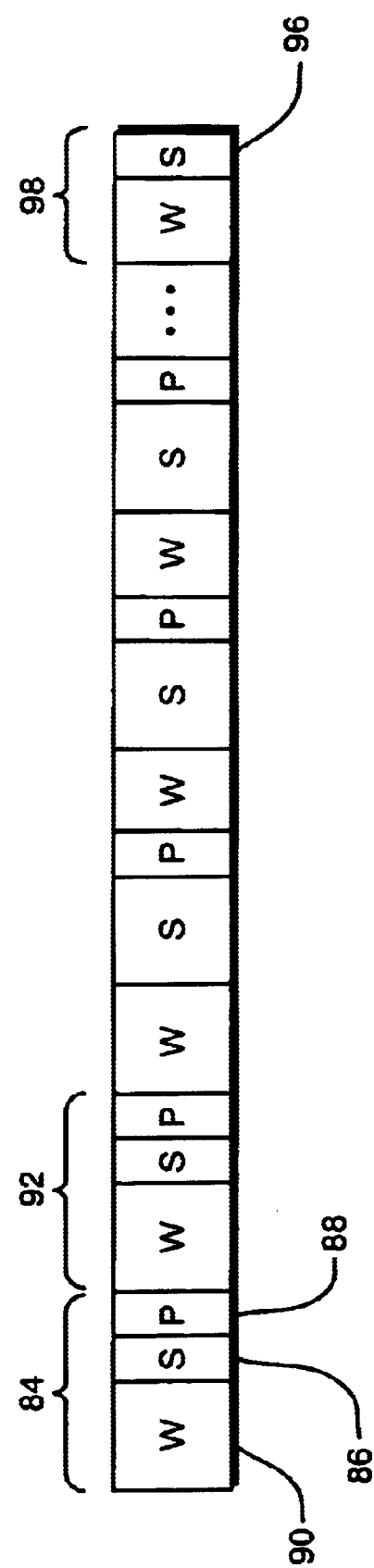
FIG. 9 shows representative scan cycles in which the scan-states are of substantially equal length.

In a second scanning method, which is that illustrated in FIG. 8, the starting slot is the slot identified by the next-message pointer of whichever slot contained the message most recently encountered by the scanning processor. When this second scanning method is used, the scanning processor avoids re-scanning slots that it may have already scanned in a recently completed scan-cycle. As a result, scan-states in successive scan-cycles will tend to have a more constant length, as shown in FIG. 9.

Figure 10:
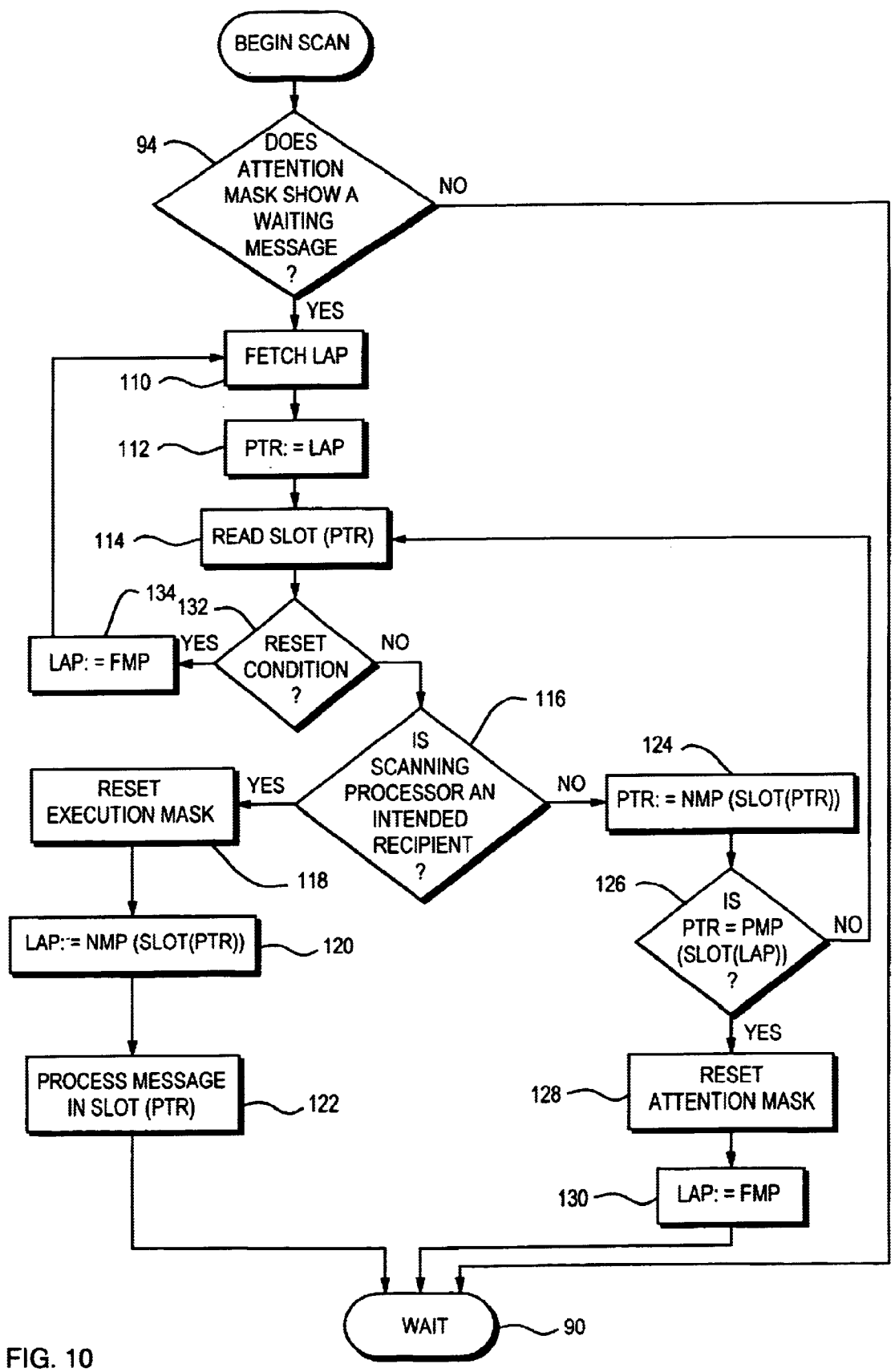
FIG. 10 is a flow-chart of a scanning method that includes a test for a reset condition.

A third scanning method, shown in FIG. 10, includes a test for the occurrence of a reset condition. In the absence of a reset condition, the scanning processor selects the starting slot to be whichever slot contained the message most recently encountered by the scanning processor. If a reset condition exists, the scanning processor selects the starting slot to be the first slot in the message-list 34.

Figure 11:
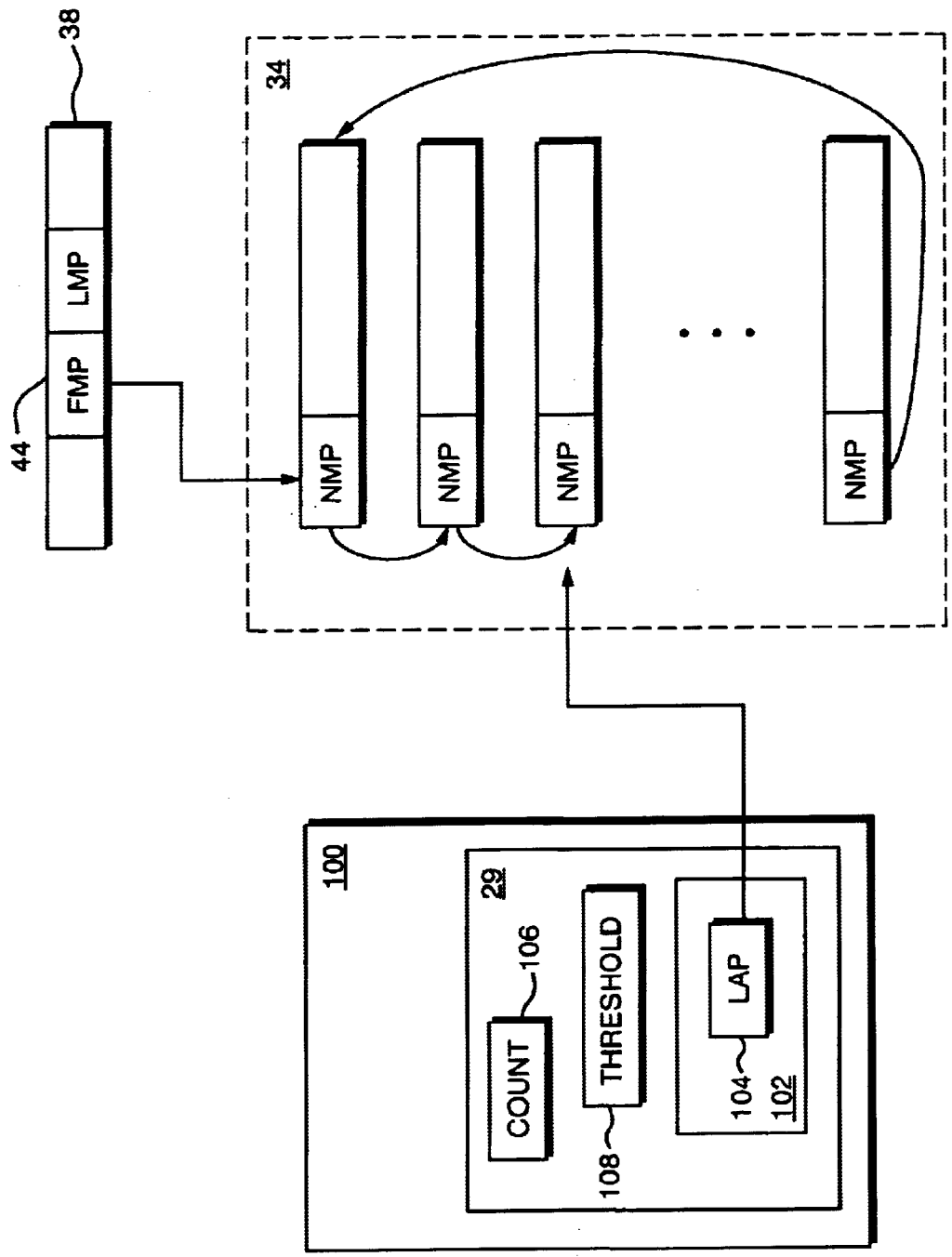
FIG. 11 shows a scanning processor configured to carry out the scanning methods shown in FIG. 8 or 10.

FIG. 11 shows a scanning processor 100 configured to implement the second or third scanning methods. The local memory 29 of the scanning processor 100 includes a cache 102 that stores a look-ahead pointer 104 identifying the address of the starting slot to be used the next time the scanning processor 100 enters its scan-state. The local memory 29 optionally includes a counter 106 and a reset threshold 108. The counter 106 and the reset threshold 108 are used only in implementing the third scanning method. They are therefore not necessary in a scanning processor 100 configured to implement only the second scanning method.

Referring back to FIG. 8, after having determined the starting slot, the scanning processor 100 begins scanning the message-list 34 from that starting slot. This can be performed by retrieving 110 the look-ahead pointer ("LAP") 104, setting 112 a temporary pointer ("PTR") to be equal to the look-ahead pointer 104, and reading 114 the slot addressed by the temporary pointer ("SLOT(PTR)"). The scanning processor 100 then inspects 116 that slot's destination mask 52 to determine if it is an intended recipient for the message carried by that slot.

If the scanning processor 100 determines that it is an intended recipient for the message carried by that slot, it resets 118 its assigned bit in the slot's execution mask 54 and sets 120 its look-ahead pointer 104 to be the next-message pointer 56 of that message slot ("NMP(SLOT(PTR))"). This causes the scanning processor 100 to begin its next scan of the message-list 34 at a point that bypasses recently inspected slots. The scanning processor 100 then interrupts the scan to process 120 the message carried in the slot's message field 50.

If the scanning processor 100 determines that it is not an intended recipient for the message carried by that slot, it follows 124 that slot's next-message pointer 56 and repeats the foregoing procedure. The scanning processor 100 then checks 126 to see if it has finished inspecting each slot on the message-list 34 without having encountered a message for which it is an intended recipient. This can be performed by determining whether the temporary pointer points to the same location as the previous message pointer 58 ("PMP") of the slot addressed by the look-ahead pointer 104.

If the scanning processor 100 determines that it has inspected each slot in the message-list 34, it resets 128 its assigned bit in the attention mask 48 of the message directory 38, resets 130 its look-ahead pointer 104 to the first-message pointer 44, and enters the wait-state 90. This causes the scanning processor 100 to begin its next scan of the message-list 34 at the beginning of the message-list 34.

Because the message-list 34 is accessible to other processors, the structure of the message-list 34 can change as a result of activity by those other processors 28. Such changes can occur in the interval between the setting 120 of the look-ahead pointer 104 at the end of one scan-state and the retrieval 110 of the look-ahead pointer 104 at the beginning of the next scan-state. The structure of the message-list 34 can also change even while a scanning processor 100 is in the midst of scanning the message-list 34. These side-effects of activity by other processors can cause the scanning processor 100 to skip over portions of the message-list 34.

Figure 12:
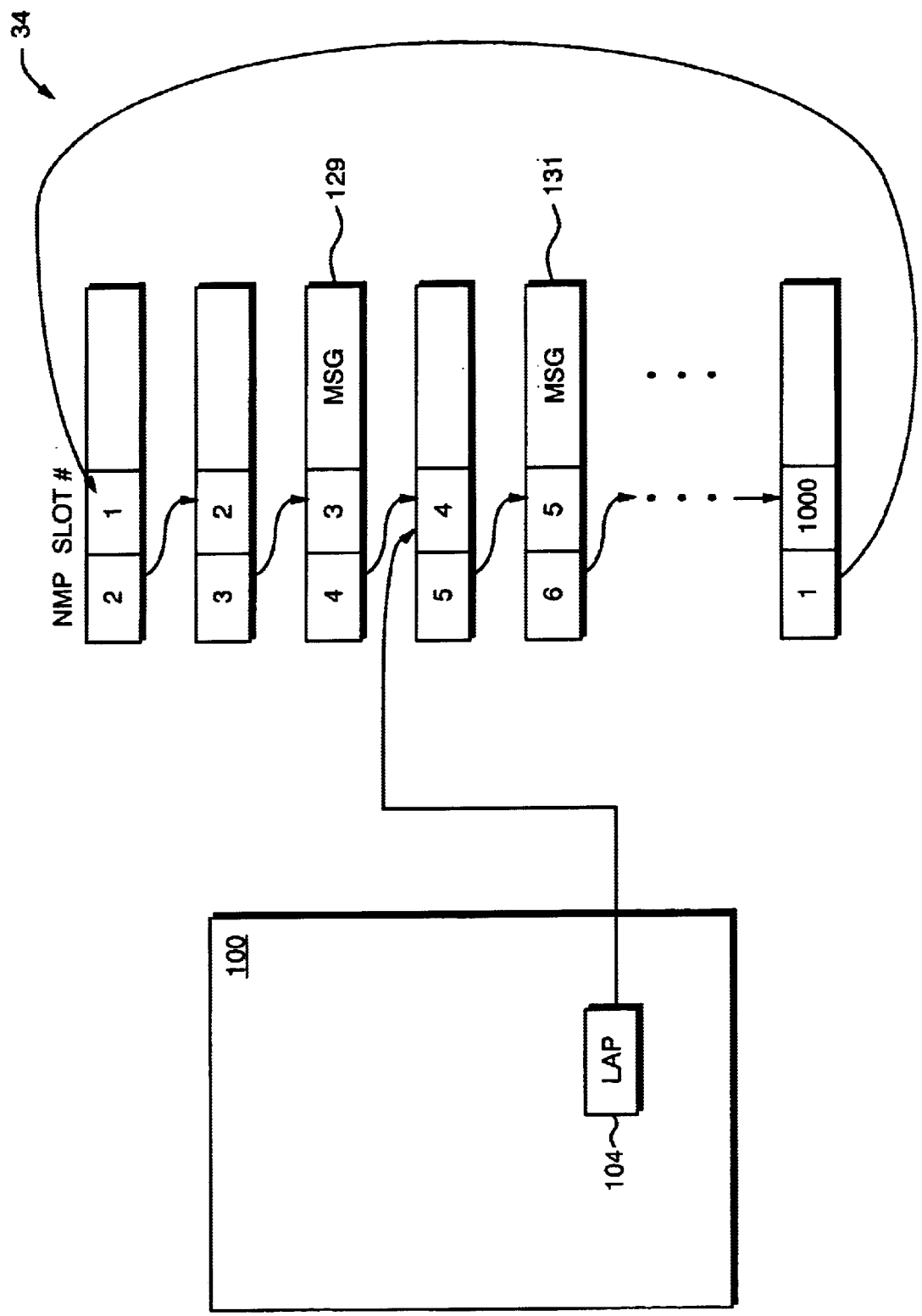
FIG. 12 shows the link structure of a representative message-list.
Figure 13:
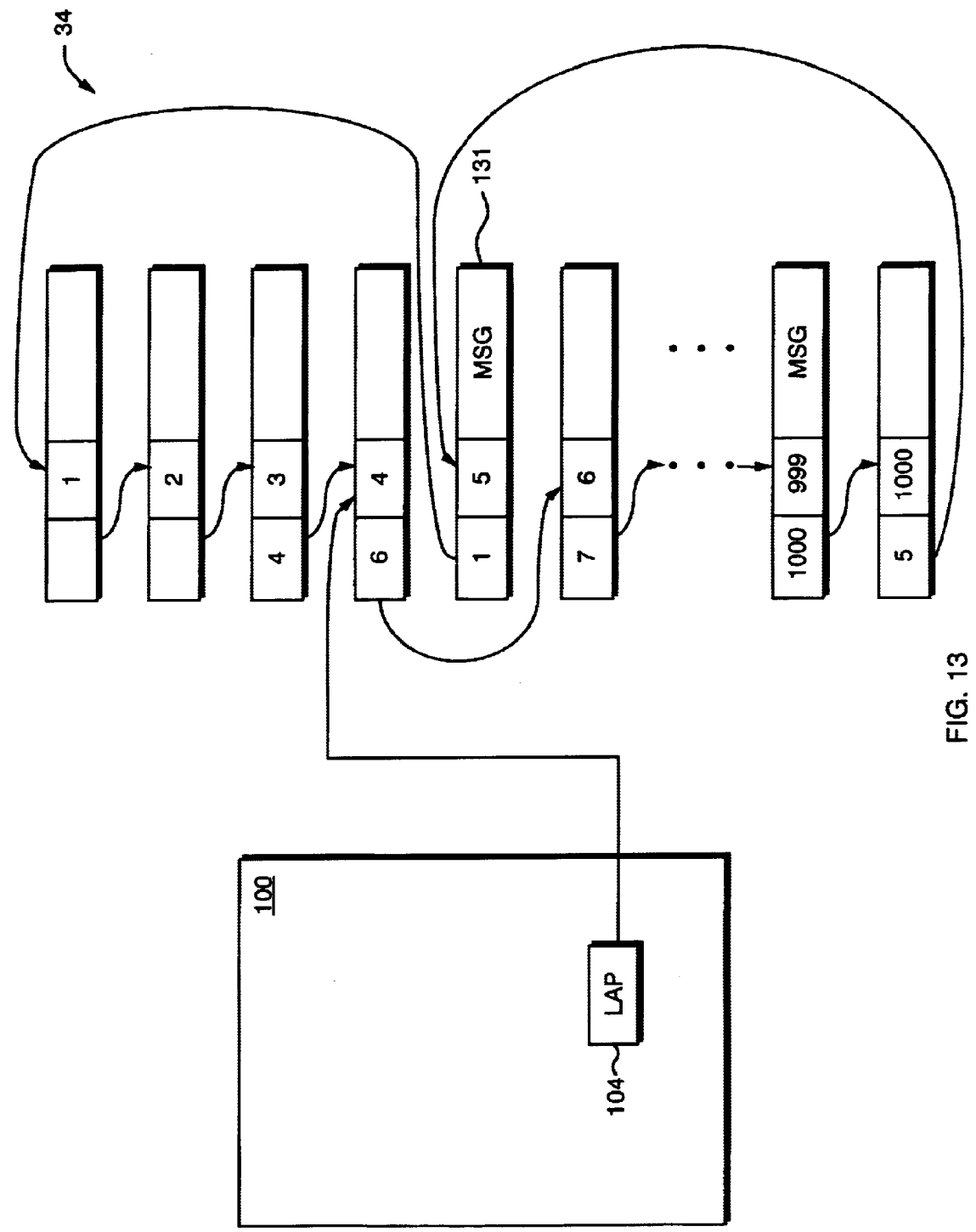
FIG. 13 shows the link structure of the message-list of FIG. 11 after having been re-structured by other processors.

FIGS. 12 and 13 together illustrate one example of how such side effects can cause a scanning processor 100 to skip over portions of the message-list 34. In FIG. 12, the scanning processor 100 has just exited a first scan-state and entered a processing-state to execute instructions in a message 129 contained in slot 3. Since the next-message pointer of slot 3 points to slot 4, the scanning processor's look-ahead pointer 104 has been set to point to slot 4. If no other processor modifies the message-list 34, the scanning processor 100 will encounter a waiting message 131 in slot 5 soon after beginning a second scan-state that follows this first scan-state.

Before the scanning processor 100 can reach slot 5, however, one or more processors 28 may have inserted and deleted messages from the message-list 34. This activity results in the message-list 34 having the structure shown in FIG. 13, in which the next-message pointer of slot 4 now points to slot 6 instead of to slot 5. As a result, the scanning processor 100 skips over the waiting message 131 in slot 5.

Although a slot skipped over during the second scan may be read by the scanning processor 100 in a third scan, this is by no means guaranteed. Additional activity by other processors 28 may again restructure the message-list 34. This restructuring may cause the scanning processor 100 to skip over a slot a second time. As a result, it is quite possible for a message to wait indefinitely before finally being encountered by a scanning processor 100.

To minimize the likelihood of delays in encountering waiting messages, the scanning processor 100 implements the third scanning method, shown in FIG. 10. The third scanning method differs from the second scanning method in the inclusion of a test 132 for the occurrence of a reset condition. If a reset condition exists, the scanning processor 100 begins the next scan at the first message on the message-list 34 instead of at the message indicated by the next-message pointer 56 of the most recently processed message. This can be implemented by setting 134 the scanning processor's look-ahead pointer 104 to the first-message pointer 44 whenever that scanning processor 100 detects the existence of a reset condition.

In one practice of the invention, a reset condition occurs whenever the number of scan-cycles since the last occurrence of a reset condition exceeds a threshold. To implement this practice of the invention, the scanning processor 100 increments the counter 106 whenever it begins a new scan-cycle. The scanning processor 100 then compares the counter 106 with the reset threshold 108. If the counter 106 exceeds the reset threshold 108, the scanning processor 100 resets 134 its look-ahead pointer 104 to the location specified by the first-message pointer 44.

The reset threshold 108 is selected to be large enough to avoid re-inspecting message slots too frequently, but not so large that messages are frequently skipped over. In a message-list 34 containing approximately 1000 slots, a reset threshold 108 of 1000 has been found to be practical. However, the optimal value of the reset threshold 108 depends heavily on the specific operating characteristics of the data-storage system 10.

In another practice of the invention, the reset threshold 108 can be adaptively set on the basis of statistics maintained on the operating characteristics of the data-storage system 10. For example, if these statistics indicate that extensive restructuring of the message-list is a likely event, then the reset threshold 108 can be set lower. Conversely, if these statistics indicate that a scanning processor is unlikely to skip over large portions of the message-list 34, the reset threshold 108 can be set higher.

In yet another practice of the invention, the reset condition occurs whenever the look-ahead pointer 104 points to an invalid location. This can occur if the message-list has become corrupted.

Deleting a Message from the Message-List

The scanning processor can occasionally encounter a message slot in which the only bit set in the execution mask 54 is its own assigned bit. This can occur if the message is intended only for that scanning processor and no other processors. This can also occur if all other intended recipients for that message have already read the message, and have therefore reset their assigned bits in that slot's execution mask 54. Once the scanning processor reads the message in such a slot, there is no longer a need to include that slot in the message-list.

The scanning processor changes such a slot, referred to as a "spent slot," to a free slot to make it available to a sending processor for holding another message. This eliminates the need to periodically execute a garbage-collection process to remove unnecessary slots from the message-list 34.

Figure 14:
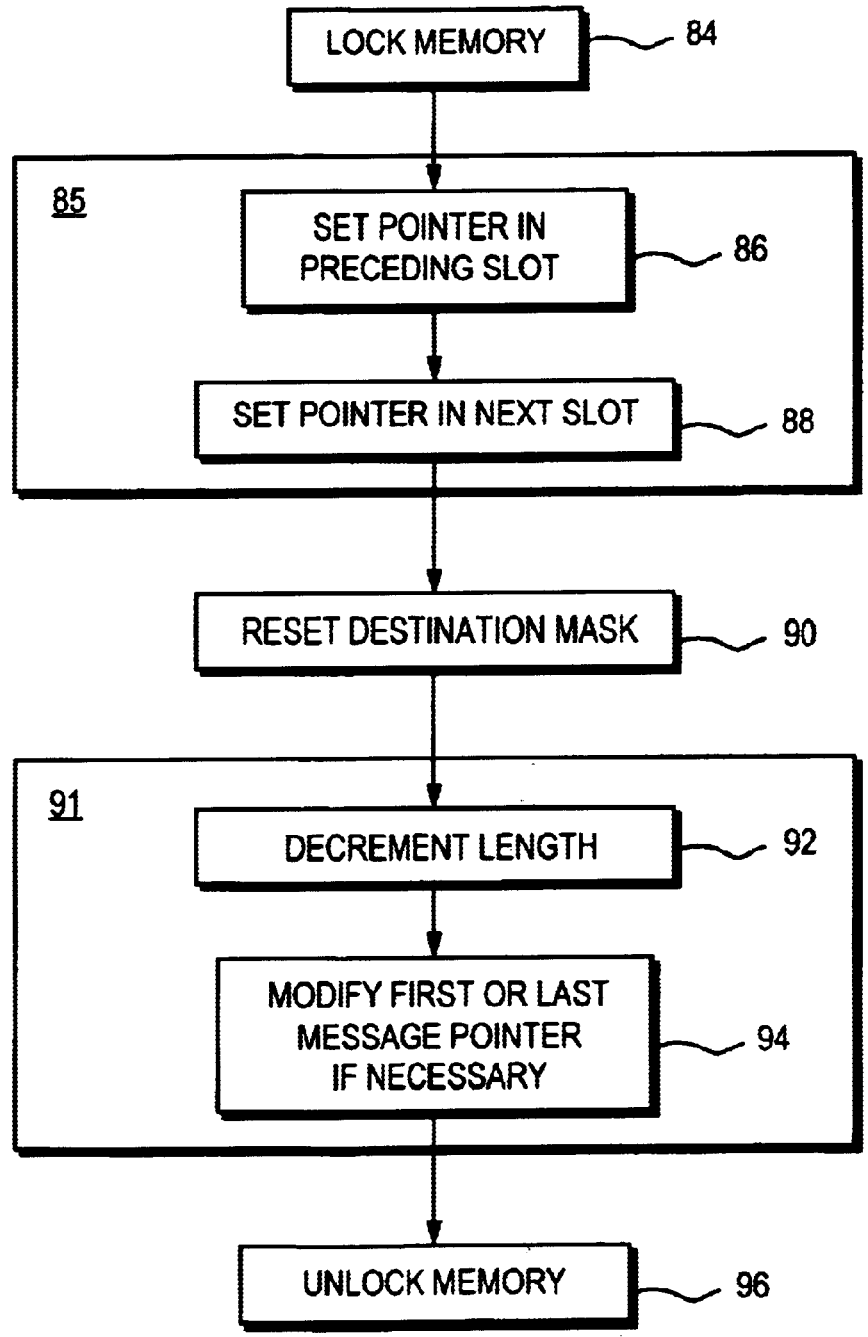
FIG. 14 is a flowchart of a process for removing a message from the message-list of FIG. 3.

Referring now to FIG. 14, the scanning processor frees a spent slot by first locking 136 the shared memory 12. The scanning processor then removes 138 the spent slot from the message-list by adjusting 140, 142 the pointers of the slots immediately preceding and immediately following the spent slot. In particular, the scanning processor changes 140 the next-message pointer 56 of the slot preceding the spent slot so that it points to the slot immediately following the spent slot. The scanning processor then changes 142 the previous-message pointer 58 of the slot immediately following the spent slot so that it points to the slot immediately preceding the spent slot. The net effect of these two operations is that a scanning processor skips over the spent slot as it scans the message-list.

After having removed the spent slot from the message-list, the scanning processor marks the spent slot as free by resetting 144 all bits in its destination mask 52. The next-message pointer 56 and the previous-message pointer 58 of the spent slot remain unaltered.

The scanning processor then updates 146 the message directory 38 by decrementing 148 the length field 42 of the message directory 38. If the spent slot is either the first of last slot in the message-list 34, the scanning processor also modifies 150 the first-message pointer 44 or the last-message pointer 46 of the message directory. Finally, the scanning processor unlocks 152 the shared memory 12.

Figure 15:
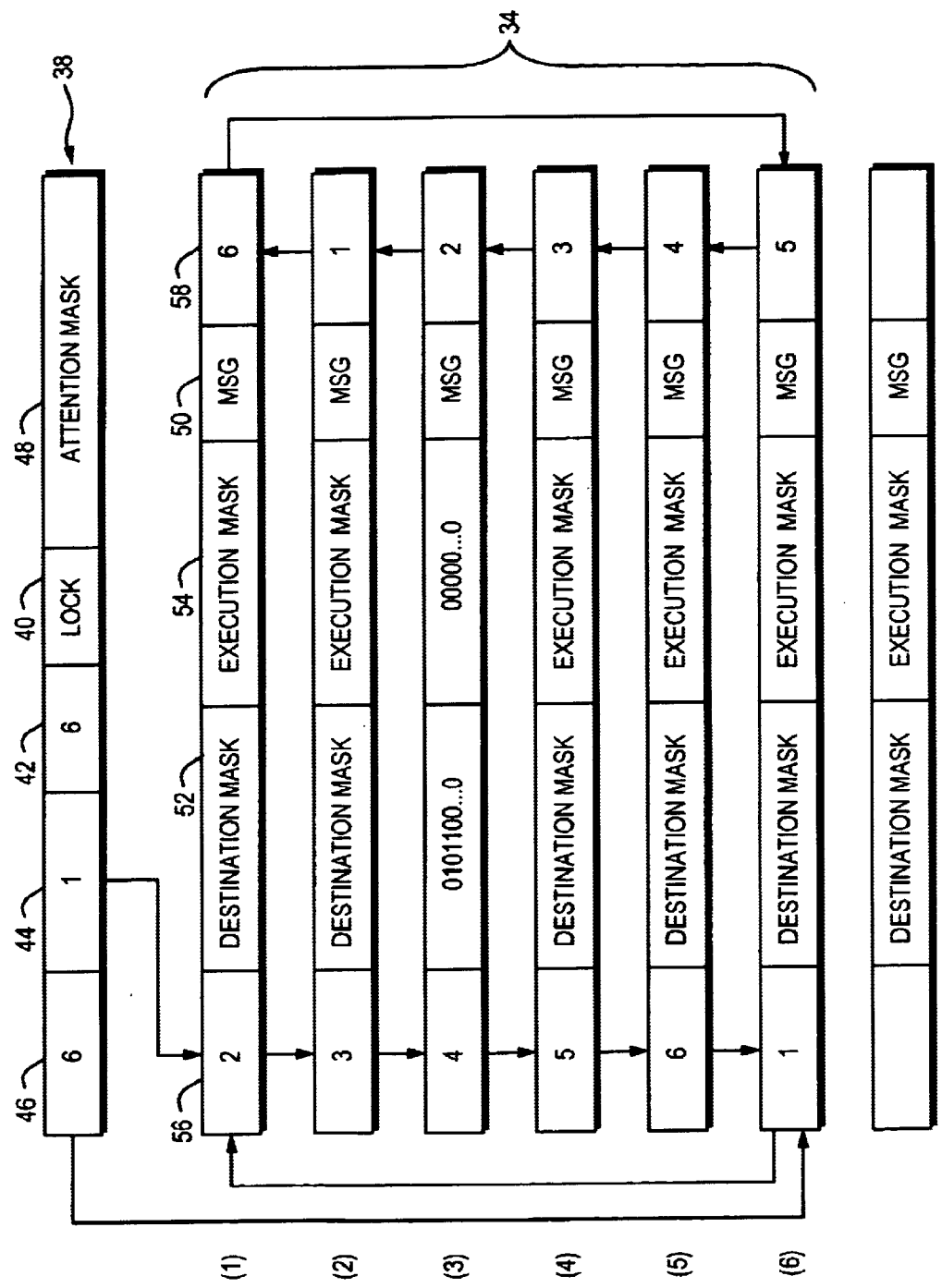
FIG. 15 shows the message-list of FIG. 3 before removing a message.

FIG. 15 shows the state of the message section 30 just before a spent slot transitions from being an occupied slot to a free slot. As indicated by the message directory 38, the message-list 34 has six slots linked to each other by pairs of pointers. For convenience, the slots are numbered from 1 to 6. The spent slot that is about to transition to its free state, namely slot 3, is shown with its execution mask 54 completely reset. This indicates that the message carried by that slot has been read by all its intended recipients.

Figure 16:
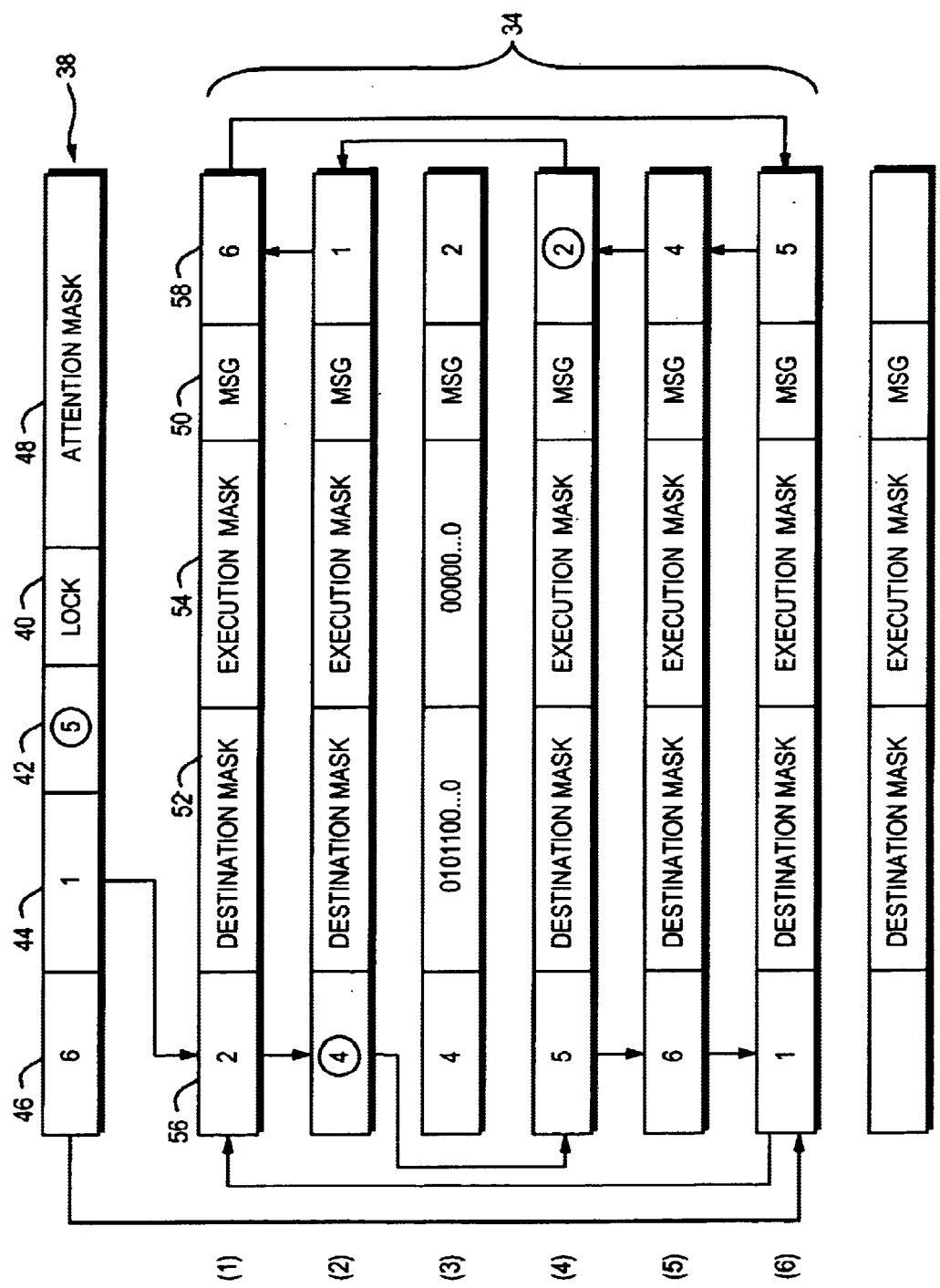
FIG. 16 shows the message-list of FIG. 3 after removing a message.

FIG. 16 shows the message-list 34 after slot 3 transitions into its free state. The destination mask 52 of the slot has been completely reset. Note that the next-message pointer 56 and the previous-message pointer 58 are unchanged. The message directory 38 has been updated to show that there are now five slots in the message-list 34. Since slot 3 was neither the first nor last slot in the message-list, the first and last message pointers 44, 46 are also unchanged.

By removing spent slots from the message-list 34 in the manner described above, the inter-processor messaging system of the invention enables one scanning processor to scan the message-list 34 even while another scanning processor removes a spent slot from the message-list 34.

For example, in the case shown in FIGS. 15 and 16, a second scanning processor scanning the message-list 34 will encounter slot 2 either before, or after a first scanning processor completes the splicing operation. If the second scanning processor encounters slot 2 after the first scanning processor completes the splicing operation, the next-message pointer 56 of slot 2 will direct the scanning processor to slot 4, correctly skipping over slot 3 in the process. If the second scanning processor reaches slot 2 before the first scanning processor can complete the splicing operation, the next-message pointer 56 of slot 2 will direct the second scanning processor to slot 3. After examining the execution mask 54 of slot 3, the second scanning processor follows the next-message pointer 56 of slot 3. Since the next-message pointer 56 of slot 3 still points to slot 4, the second scanning processor will proceed correctly to slot 4. Hence, in either case, the second scanning processor correctly reaches slot 4.

It is to be understood that while the invention has been described in conjunction with the foregoing detailed description, the foregoing description is intended only to illustrate one practice of the invention. The scope of the invention, is defined by the appended claims.

What is claimed is:

1. A method for scanning a message-list accessible to a plurality of processors, said method comprising:
   identifying, in said message-list, a message-slot containing a message intended for a recipient processor from said plurality of processors;
   obtaining, from said identified message-slot, information indicative of a location of a succeeding message-slot in said message-list; and
   caching, for retrieval during a subsequent scan of said message-list, said information indicative of said location of said succeeding message-slot by determining if a reset condition exists and caching said information if no reset condition exists;
   wherein determining if a reset condition exists comprises determining whether a number of scans since a previous occurrence of a reset condition exceeds a threshold.

2. The method of claim 1, wherein obtaining information indicative of said location of said succeeding message-slot comprises obtaining a next-message pointer from said identified message-slot.

3. The method of claim 1, wherein caching said information indicative of said location of said succeeding message-slot comprises storing said information in a memory local to said recipient processor.

4. A method for scanning a message-list accessible to a plurality of processors, said method comprising:
   retrieving, from a cache associated with a scanning processor from said plurality of processors, information identifying a starting message-slot; and
   beginning a scan of said message-list at said starting message-slot by determining whether a reset condition exists and beginning said scan at said starting message-slot if no reset condition exists;
   wherein determining whether a reset condition exists comprises determining whether a number of scans since a previous occurrence of a reset condition exceeds a threshold.

5. The method of claim 4, wherein retrieving information identifying a starting message-slot comprises retrieving a pointer to a message subsequent to a previous message intended for said scanning processor.

6. A data-storage system comprising:
   a plurality of processors, each processor having a local memory, the local memory including reset-detecting process configured to detect a reset condition;
   a shared memory accessible to each processor in said plurality of processors;
   a message section in said shared memory, said message section including a message-list having an ordered sequence of message-slots, each of said message-slots including information identifying a succeeding slot in said message-list;
   wherein said reset-detecting process is configured to compare a reset threshold with an interval since a scanning processor encountered a message-slot containing a message for which said scanning processor was an intended recipient.

7. The data-storage system of claim 6, wherein said local memory comprises a cache for storage of said information identifying a succeeding slot.

8. The data-storage system of claim 7, wherein said cache comprises a look-ahead pointer identifying said succeeding message-slot.

9. The data-storage system of claim 8, wherein said local memory comprises a counter indicating an interval since a scanning processor encountered a message-slot containing a message for which said scanning processor was an intended recipient.

10. The data-storage system of claim 9, wherein said counter indicates a number of scans since a scanning processor encountered a message-slot containing a message for which said scanning processor was an intended recipient.

11. The data-storage system of claim 6, wherein said reset-detecting process is configured to declare a reset condition when said interval exceeds said reset threshold.

12. The data-storage system of claim 6, wherein said reset-detecting process is configured to detect whether said information identifying a succeeding slot in said message-slot is invalid.

13. The data-storage system of claim 12, wherein said reset-detecting process is configured to declare a reset condition when said information identifying a succeeding slot in said message-list is invalid.

14. A computer-readable medium having encoded thereon software for scanning a message-list accessible to a plurality of processors, said software comprising instructions for:
   identifying, in said message-list, a message-slot containing a message intended for a recipient processor from said plurality of processors;
   obtaining, from said identified message-slot, information indicative of a location of a succeeding message-slot in said message-list; and caching, for retrieval during a subsequent scan of said message-list, said information indicative of said location of said succeeding message-slot by determining if a reset condition exists and caching said information if no reset condition exists;

wherein said instructions for determining whether a reset condition exists comprise instructions for determining whether a number of scans since a previous occurrence of a reset condition exceeds a threshold.

15. The computer-readable medium of claim 14, wherein said instructions for obtaining information indicative of said location of said succeeding message-slot comprise instructions for obtaining a next-message pointer from said identified message-slot.

16. The computer-readable medium of claim 14, wherein said instructions for caching said information indicative of said location of said succeeding message-slot comprise instructions for storing said information in a memory local to said recipient processor.

17. A computer-readable medium having encoded thereon software for scanning a message-list accessible to a plurality of processors, said software comprising instructions for:

retrieving, from a cache associated with a scanning processor from said plurality of processors, information identifying a starting message-slot; and beginning a scan of said message-list at said starting message-slot by determining whether a reset condition exists and beginning said scan at said starting message-slot if no reset condition exists;

wherein said instructions for determining whether a reset condition exists comprise instructions for determining whether a number of scans since a previous occurrence of a reset condition exceeds a threshold.

18. The computer-readable medium of claim 17, wherein said instructions for retrieving information identifying a starting message-slot comprise instructions for retrieving a pointer to a message subsequent to a previous message intended for said scanning processor.

* * * * *